Figure 1:
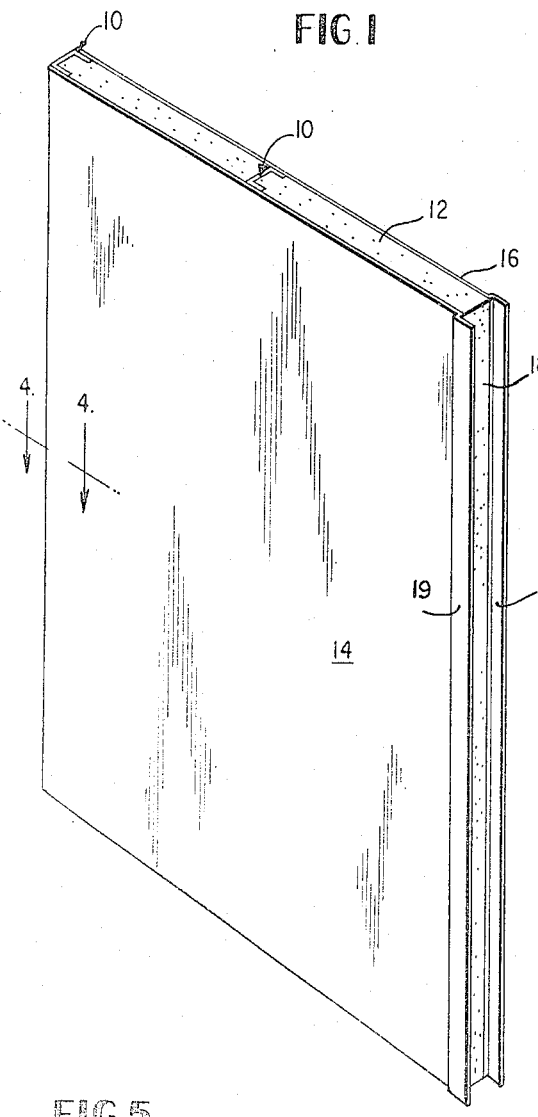

INVENTOR.
HOWARD G. MATHEWS
BY
Decker & Craig
ATTORNEYS.

United States Patent Office 3,313,073
Patented Apr. 11, 1967

3,313,073
JOINT ASSEMBLIES FOR INSULATION PANELS
Howard G. Mathews, Levittown, N.J., assignor to Foam Products Corporation, Thomasville, Ga.
Filed Sept. 24, 1962, Ser. No. 225,554
6 Claims. (Cl. 52—309)

The present invention relates to improvements in laminate panels used in fabricating insulated enclosures. More particularly, the present invention relates to improvements in interlocking joints uniting adjacent panels of an insulated enclosure.

Prefabricated insulation panels are utilized in walk-in type enclosures such as freezers and the like, and to insulate transportation vehicles such as trailers and railroad cars. With panels heretofore available, difficulties have been experienced in providing means for fastening adjacent panels together to form a fluid-tight joint while at the same time providing adequate structural support at the edges of the panels without reducing the insulating effectiveness of the panels. Certain prior art joint assemblies using metallic reinforcing means at the edges of the panels suffer from the disadvantage that a thermal bridge, i.e., a metal-to-metal contact through the joint is formed. This is a disadvantage since the thermal conductivity of the enclosure is increased, and consequently the difficulties of maintaining close control over the conditions within the enclosure are increased.

It is a primary object of the present invention to provide improved insulation panels having integral joint portions adapted to interlock with complementary joint portions of adjacent panels to form a moisture proof seal.

Another object of the present invention is to lower the over-all thermal conductivity of an enclosure formed from insulated panels by minimizing heat transfer through the joints between the panels.

Still another object of the present invention is to provide improved reinforcing means at the edges of insulation panels which reinforcing means are also effective to improve the seal between adjacent panels.

A further object of the present invention is to provide joint means between adjacent insulation panels including self-tapping screws which pass into metal fastening strips to prevent the screws from being stripped out.

A still further object of the present invention is to provide a fibre-glass reinforcing channel for insulation panels which channel may simultaneously form joint means at one edge of the panels.

In accordance with one embodiment of the present invention, a U-shaped channel of fibre-glass having strips of metal along the insides of the flange portions of the U-shaped channel is encased in a suitable epoxy resin, and secured along one longitudinal edge of an insulation panel with parts of the flange portions embedded within the panel. The remaining parts of the U-shaped channel are adapted to be received between projecting covers of an adjacent panel. When adjacent panels are in abutting relationship, self-tapping screws may be passed through the projecting covers and anchored within the metal strips of the U-shaped channel to thereby prevent the screws from being stripped out.

In another embodiment of the present invention, metal reinforcing strips are secured at the ends of an essentially I-shaped fibre-glass channel member by an epoxy resin coating. The I-shaped channel has a web portion positioned between the edges of adjacent panels with the ends of the channel overlying the edges of the panels. Self-tapping screws extend through the metal strips at the ends of the channel into the panels forming a tight joint.

In other embodiments of the present invention, a metal reinforcing strip is fastened along one edge of a panel provided with joint means interlocking with the joint means of an adjacent panel. In forming a moisture proof seal between the panels, self-tapping screws are passed through the covers of the panels and into the metal strips to be anchored by the metal strip so that the screws are securely held in position.

Figure 2:
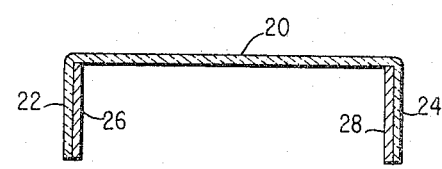
Figure 3:
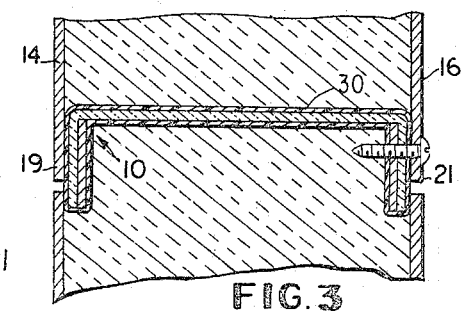
Figure 4:
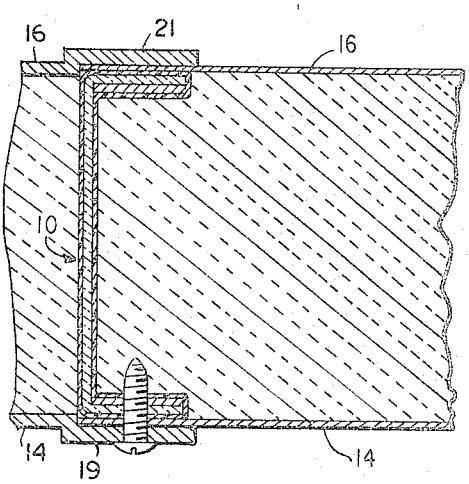
Figure 5:
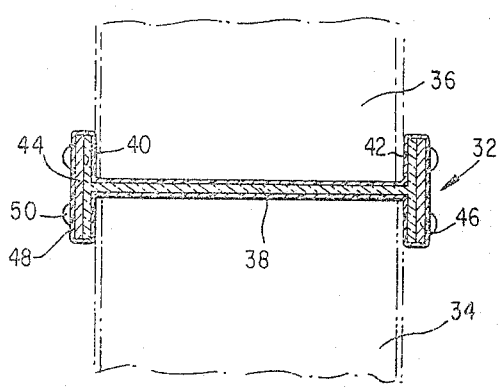
Figure 6:
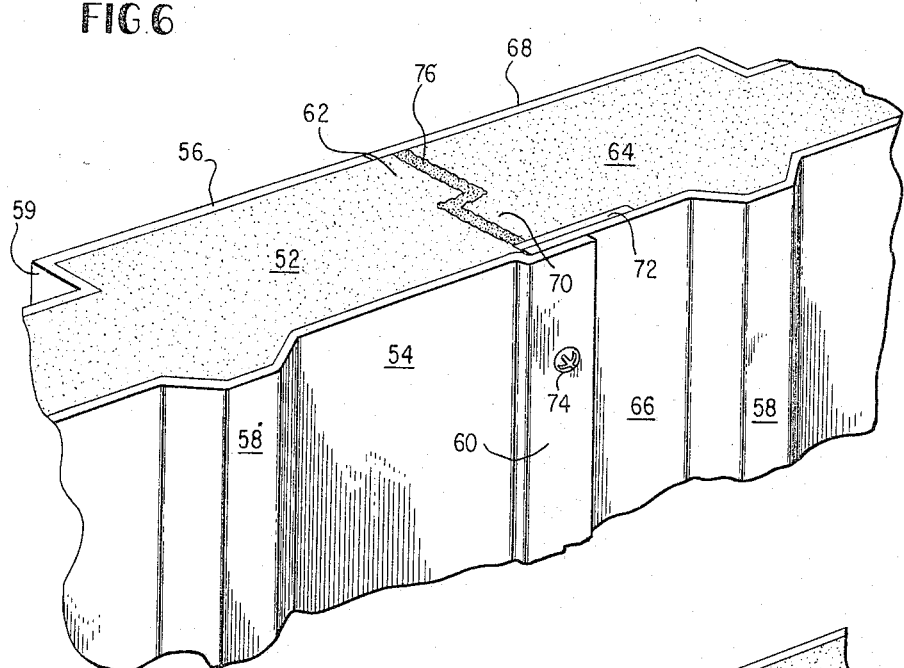
Figure 7:
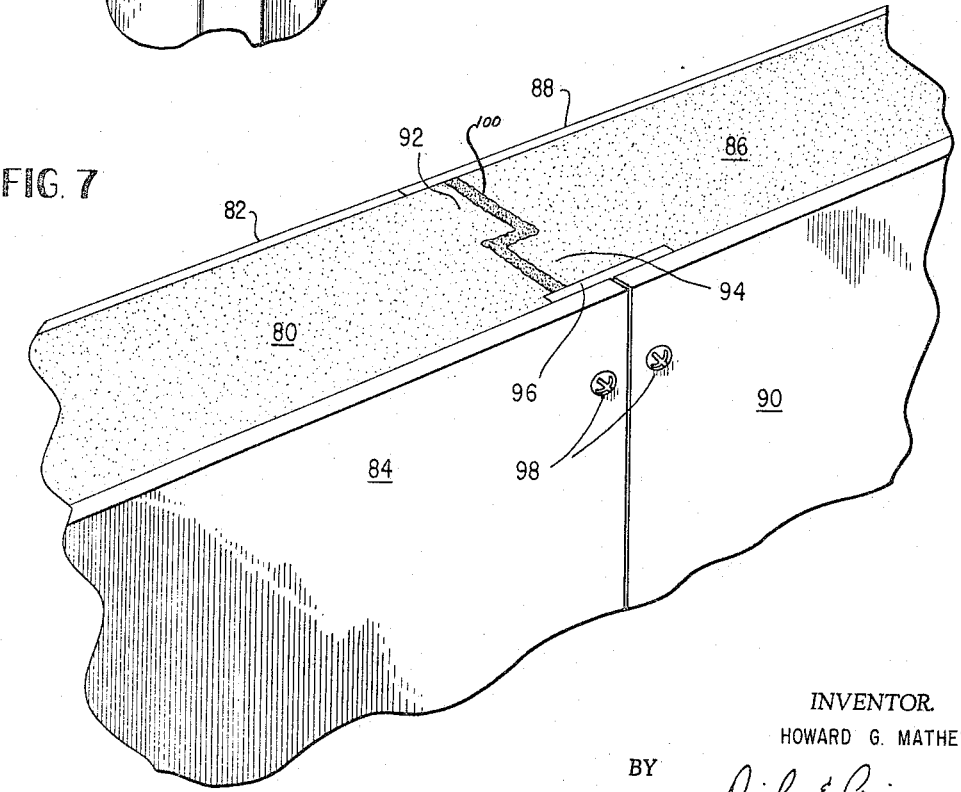

The above and other objects, features, and advantages of the present invention will become more apparent from the following description when taken in conjunction with the accompanying drawings wherein:

FIGURE 1 is a perspective view of an insulation panel in accordance with one embodiment of the present invention, FIGURES 2 and 3 illustrate steps in the production of a reinforcing channel member used in the embodiment of FIGURE 1, the completed channel member being illustrated in FIGURE 3 in a joint construction, FIGURE 4 is a horizontal sectional view along the line 4—4 of FIGURE 1 showing a reinforcing channel member secured at one longitudinal edge of a panel, with a section of an adjacent panel in association therewith, FIGURE 5 is a partial sectional view through another embodiment of the present invention wherein adjacent panels are united by means of an I-shaped channel member with the panels being shown diagrammatically, FIGURE 6 is a partial perspective view of an interlocking joint between adjacent panels in accordance with another embodiment of the present invention, and FIGURE 7 is a view similar to FIGURE 6 of a further embodiment of the present invention.

Referring now to the drawings, and more particularly to FIGURE 1, a pair of essentially U-shaped reinforcing channel members each generally designated by reference numeral 10 are embedded within an insulation panel core 12 which is positioned between covers 14 and 16. One channel member 10 is secured along a longitudinal edge of the panel with covers 14 and 16 overlying flanges of the channel member. The other channel member is positioned essentially in the middle of the panel as an intermediate support member. At the opposite longitudinal edge of the panel, core 12 terminates in an edge surface 18 which is recessed from projecting offset edges 19, 21 of covers 14 and 16, respectively. The right hand edge of the panel shown in FIGURE 1 is thus adapted to receive therein the edge channel member 10 of an adjacent panel.

Referring now to FIGURES 2, 3, and 4, a channel member 10 includes a fibre-glass channel having a web portion 20 interconnecting a pair of flanges 22 and 24 which are essentially bent at right angles to web portion 20. Metal reinforcing strips 26 and 28 which are preferably made of steel are placed against the inner facing surfaces of flanges 22 and 24. The structure shown in FIGURE 2 is then placed into a suitable mold and encapsulated in a plastic covering 30 which is preferably an epoxy resin to form a completed channel member such as shown in FIGURE 3 in conjunction with a joint construction. The completed channel members are subsequently placed between covers 14 and 16 in a suitable mold for bonding to the core 12 which is foamed in the mold to form a completed construction as illustrated in FIGURE 3. Core 12 is preferably a rigid polyurethane foam since such material combines low thermal conductivity with high compressive strength. The density of the foam is controlled to maintain a compressive strength in the order of 50 p.s.i. In lieu of encapsulating metal strips 26 and 28, these strips may be secured to the insides of flanges 22 and 24 in any suitable manner.

After insertion of the edge of one panel having an end channel member 10 into the recess between the projecting edges 19, 21, and the recessed core edge 18 of an adjacent panel, self-tapping screws are passed through the projecting edge 19, cover 14, plastic coating 30, flange 22, and metal strip 26, or through projecting edge 21, cover 16, plastic coating 30, flange 24, and metal strip 28. This arrangement provides a secure seal between adjacent panels while avoiding a thermal bridge through the panels. Additionally, the present invention provides a greatly strengthened over-all structure. A panel six inches thick will withstand compression loads in the order of 80 pounds per square foot in applications where metal strips 26 and 28 are of two inches in width and fourteen guage thickness on spans of sixteen feet. This is so because in the case of compression loads, before failure occurs, it would be necessary to first overcome the compressive strength of the core and also to break down the reinforced channel member. With respect to tensile loads, the fibre-glass channel has extremely high tensile strength so that the channels are suitable for use in horizontal as well as vertical panels.

It will be appreciated that the above-described joints apply only to panels lying in common planes. For corner joints between adjacent walls or between the walls and the floor or ceiling, the ends of the panels forming the corners are preferably modified to form essentially foam-to-foam joints. For example, at the joint between a ceiling panel and a wall panel, the ceiling panel rests upon the upper edge of the wall panel and the inner cover of the ceiling panel is cut back a distance corresponding to the thickness of the wall panel so that a foam-to-foam joint is formed. The outer cover of the ceiling panel is preferably provided with a depending edge portion which extends down and overlaps the upper outer edge of the wall panel. Securing means are then passed through the overlapping portion of the outer cover into the wall panel. The other corner joints are similarly formed, and may be visualized by rotating the above-described corner joint between the ceiling and the wall into an appropriate position to form a vertical wall corner joint, etc. In the case of the wall corner joint, the inner panel cover which is of reduced length is preferably provided with a transverse extension which overlaps the adjoining edge portion of the adjacent panel to enable securing means to be passed through this overlapping portion into the adjacent panel. This arrangement may also be applied to the other corner joint, but is intended primarily for the corner wall joints.

FIGURE 5 illustrates another embodiment of the present invention wherein an essentially I-shaped reinforcing channel member generally designated by reference numeral 32 forms a joint between two adjacent panels 34 and 36. Panels 34 and 36 are shown diagrammatically since they may be of any suitable construction and are not provided with interlocking joint portions. Channel member 32 includes a fibre-glass web 38 interconnecting fibre-glass flanges 40 and 42. In this embodiment, metal strips 44 and 46 are secured to the outside surfaces of flanges 40 and 42, preferably by being encapsulated in an epoxy resin coating 48. Panels 34 and 36 are received between flanges 40 and 42 on either side of web portion 38, and are anchored in place by screws 50 passing through one of metal strips 44 and 46, through the fibreglass flanges 40 or 42, and into panels 34 and 36.

The embodiment of FIGURE 6 shows an interlocking joint between adjacent panels in accordance with another embodiment of the present invention. The panel shown to the left-hand side of FIGURE 6 includes a core 52 which is preferably a rigid polyurethane foam encased in covers 54 and 56. Cover 54 is preferably made of reinforced fibre-glass and may be provided with projecting ribs 58 and also includes an offset longitudinal edge portion 60.

Cover 56 may be of aluminum foil and is preferably provided with grooves 59 if the panels are to be applied over furring strips or the like in existing equipment. Core 52 includes a projecting offset portion 62. The panel to the right hand side of FIGURE 6 includes a core 64 enclosed in covers 66 and 68. These covers are also preferably provided with corrugations 58 and grooves 59, respectively. Core 64 includes an offset projecting edge portion 70 which is complementary to the projecting edge portion 62 of the other panel. A reinforcing metal strip 72, which is preferably steel, is secured between the offset core portion 70 and the inside surface of core 66 by an adhesive. The offset edge portion 60 of cover 54 of the other panel is adapted to overlie the strip 72 and the edge of cover 66. Self-tapping screws 74 are passed through offset portion 60 and anchored by metal strip 72. A rubber-based adhesive cement 76 or other suitable sealing material is placed between the interlocking portions of the panels to insure a fluid-tight joint.

In the embodiment illustrated in FIGURE 7, a panel including a rigid foam core 80 and covers 82 and 84 is united to a panel including a core 86 and covers 88 and 90. Covers 84 and 90 may be coated plywood and covers 82 and 88 may be aluminum foil. Cores 80 and 86 are provided with offset edge portions 92 and 94. A reinforcing metal strip 92 which preferably consists of steel is secured to core 86 and extends outwardly beyond cover 90. Cover 84 of the other panel extends outwardly beyond the portion of core 80 adjacent thereto and overlies a portion of strip 96 when the panels are united. In this position, self-tapping screws 98 are passed through covers 84 and 90 and anchored by reinforcing strip 96. A suitable adhesive 100 such as rubber-based mastic cement is applied to the joint between cores 80 and 86 to insure an air and moisture-proof seal.

Corner panels for the three last-mentioned embodiments may be formed in a manner similar to that described previously in connection with FIGURES 1 through 5 to provide essentially foam-to-foam joints.

While several embodiments in accordance with the present invention have been shown and described, it will be appreciated that the present invention is not limited to the specific details shown and described, but is susceptible of many changes and modifications. For example, in lieu of providing offset edge portions to form the female joints of the panels, it would be possible to recess the covers of the interlocking panel a sufficient distance to receive the edge portions constituting the female joint without offsetting these edge portions from the remainder of their respective covers. Accordingly, it is intended to encompass all such changes and modifications as fall within the scope of the appended claims.

I claim:

1. An insulation panel comprising a core, a pair of covers substantially enclosing said core, said core having an edge extending outwardly slightly beyond said covers, a reinforcing channel member having a web portion positioned against said edge of said core and having flange portions extending inwardly from said edge, said reinforcing channel member including an essentially U-shaped fibre-glass member and metal reinforcing strips positioned at the facing surfaces of said flange portions of said channel member, and said covers at the opposite edge of said panel projecting outwardly beyond said core by a distance essentially corresponding to the projection of said edge of said core plus the thickness of said web portion.

2. An insulation panel comprising a rigid polyurethane foam core, a pair of covers substantially enclosing said core, said core having an edge extending outwardly slightly beyond said covers, a reinforcing channel member having a web portion positioned against said edge of said core and having flange portions extending inwardly from said edge, said reinforcing channel member including an essentially U-shaped fibre-glass member and steel reinforcing strips positioned at the facing surfaces of said flange portions of said channel member, and said covers at the opposite edge of said panel projecting outwardly beyond said core by a distance essentially corresponding to the projection of said edge of said core plus the thickness of said web portion.

3. An insulation panel comprising a core, a pair of covers substantially enclosing said core, said core having an edge extending outwardly slightly beyond said covers, a reinforcing channel member having a web portion positioned against said edge of said core and having flange portions extending inwardly from said edge, said reinforcing channel member including an essentially U-shaped fibre-glass member and metal reinforcing strips positioned at the facing surfaces of said flange portions of said channel member, a plastic coating at least partially encasing said U-shaped member and said metal strips, and said covers at the opposite edge of said panel projecting outwardly beyond said core by a distance essentially corresponding to the projection of said edge of said core plus the thickness of said web portion.

4. An insulation panel construction comprising a pair of panels, each including a core, a pair of covers substantially enclosing said core, said core having an edge extending outwardly slightly beyond said covers, a reinforcing channel member having a web portion positioned against said edge of said core and having flange portions extending inwardly from said edge, said reinforcing channel member including an essentially U-shaped fibre-glass member and metal reinforcing strips positioned at the facing surfaces of said flange portions of said channel member, a plastic coating at least partially encasing said U-shaped member and said metal strips, said covers at the opposite edge of said panel projecting outwardly beyond said core by a distance essentially corresponding to the projection of said edge of said core plus the thickness of said web portion, and a joint between said pair of panels formed by the interengagement of the end of one panel having said reinforcing channel member and the end of the other panel having said outwardly projecting covers, a cover member of one panel extending over said joint and being secured to the adjacent panel by fastening means extending through said cover member and a metal reinforcing strip.

5. A joint assembly for uniting panels comprising:
a pair of adjacent panels having interlocking edge portions each of said panels including a pair of covers substantially enclosing a core,
a first panel having an edge portion forming a male interlocking edge portion including a core having an edge projecting outwardly slightly beyond the respective covers, a reinforcing channel member having a web portion positioned against the edge of said core and flange portions extending inwardly from said edge of said core, said reinforcing channel member including an essentially U-shaped fibre-glass member and metal reinforcing strips positioned against the facing surfaces of said flange portions,
the second panel having an edge portion forming a female interlocking edge portion engaging said male interlocking edge portion of said first panel, including covers having projecting portions, projecting beyond an edge of the respective core by a distance essentially corresponding to the projection of the core of the first panel beyond the edge of the respective covers plus the thickness of said web portion.,
and self tapping screws, for fastening said joint assembly, extending through said projecting portion of said second panel, said flange portion of said channel member and said metal strip.

6. A joint assembly for uniting panels comprising:
a pair of adjacent panels having interlocking edge portions each of said panels including a pair of covers substantially enclosing a core,
a first panel having an edge portion forming a male interlocking edge portion including a core having an edge projecting outwardly slightly beyond the respective covers, a reinforcing channel member having a web portion positioned against the edge of said core and flange portions extending inwardly from said edge of said core, said reinforcing channel member including an essentially U-shaped fibre-glass member and metal reinforcing strips positioned against the facing surfaces of said flange portions, a plastic coating at least partially encasing said U-shaped member and said metal strips,
the second panel having an edge portion forming a female interlocking edge portion engaging said male interlocking edge portion of said first panel, including covers having projecting portions, projecting beyond an edge of the respective core by a distance essentially corresponding to the projection of the core of the first panel beyond the edge of the respective covers plus the thickness of said web portion,
and self tapping screws, for fastening said joint assembly, extending through said projecting portion of said second panel, said flange portion of said channel member and said metal strip.

References Cited by the Examiner

UNITED STATES PATENTS

| | | | |
|---|---|---|---|
| 484,413 | 10/1892 | Espitallier | 52—199 |
| 1,333,553 | 3/1920 | Martinet | 52—511 |
| 2,249,590 | 7/1941 | Allen | 161—54 |
| 2,278,956 | 4/1942 | Wagner | 52—181 |
| 2,731,682 | 1/1956 | Evans | 52—615 |
| 2,858,580 | 11/1958 | Thompson | 52—481 |
| 2,962,323 | 11/1960 | McBride | 52—39 |
| 3,045,293 | 7/1962 | Potchen | 52—309 |
| 3,104,194 | 9/1963 | Zahorski | 52—408 X |
| 3,113,401 | 12/1963 | Rose | 52—417 |
| 3,122,860 | 3/1964 | Schulze | 52—309 |
| 3,153,692 | 10/1964 | Lindgren | 52—408 X |

FOREIGN PATENTS

| | | |
|---|---|---|
| 224,773 | 1959 | Australia. |
| 784,319 | 1957 | Great Britain. |

FRANK L. ABBOTT, *Primary Examiner.*

JACOB L. NACKENOFF, *Examiner.*

J. E. MURTAGH, *Assistant Examiner.*